(12) United States Patent
Liu

(10) Patent No.: US 8,480,046 B2
(45) Date of Patent: Jul. 9, 2013

(54) BRACKET FOR MOUNTING EXPANSION CARD TO DIFFERENT SLOTS

(75) Inventor: Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 141 days.

(21) Appl. No.: 12/980,352

(22) Filed: Dec. 29, 2010

(65) Prior Publication Data

US 2012/0153106 A1     Jun. 21, 2012

(30) Foreign Application Priority Data

Dec. 20, 2010   (CN) .......................... 2010 1 0596697

(51) Int. Cl.
*A47B 96/00*   (2006.01)
(52) U.S. Cl.
USPC ................ 248/221.11; 248/225.11; 248/27.3; 361/679.32
(58) Field of Classification Search
USPC .................. 361/679.31, 679.32, 785, 679.02, 361/679.55, 679.56, 679.58, 679.6, 679.41, 361/679.42, 679.43, 679.44, 679.45, 679.4, 361/790, 797, 755, 756, 741; 439/327, 377; 248/27.1, 223.41, 224.61, 222.12, 225.11, 248/27.3, 221.11; 312/223.2; 174/666, 380, 174/382
See application file for complete search history.

(56) References Cited

U.S. PATENT DOCUMENTS

| | | | | | |
|---|---|---|---|---|---|
| 3,603,845 | A | * | 9/1971 | Beers | 361/796 |
| 3,640,399 | A | * | 2/1972 | Hartman | 211/175 |
| 4,462,499 | A | * | 7/1984 | Calabro | 211/41.17 |
| 5,909,359 | A | * | 6/1999 | Summers et al. | 361/748 |
| 6,021,049 | A | * | 2/2000 | Thompson et al. | 361/759 |
| 6,027,358 | A | * | 2/2000 | Lai et al. | 439/327 |
| 6,126,471 | A | * | 10/2000 | Yu et al. | 439/327 |
| 6,174,189 | B1 | * | 1/2001 | Kuo et al. | 439/327 |
| 6,331,940 | B1 | * | 12/2001 | Lin | 361/785 |
| 6,424,521 | B1 | * | 7/2002 | Vega et al. | 361/679.41 |
| 6,807,052 | B2 | * | 10/2004 | Erickson et al. | 361/679.02 |
| 7,002,791 | B2 | * | 2/2006 | Diatzikis et al. | 361/679.4 |

* cited by examiner

*Primary Examiner* — Terrell McKinnon
*Assistant Examiner* — Eret McNichols
(74) *Attorney, Agent, or Firm* — Altis Law Group, Inc.

(57) ABSTRACT

A bracket for mounting an expansion card to different slots of enclosures is disclosed. The bracket includes a base for attaching the expansion card thereon, a pair of rails attached on the base, a sliding element being slidably connected between the rails, a connecting element fixed to the sliding element and a locking element slidably connected to the sliding element. The sliding element is movable on the base between at a first position where the connecting element is received in the base and a second position where the connecting element is spaced from the base. The locking element is movable relative to the sliding element to fix the sliding element to the base or release the sliding element from the base.

16 Claims, 11 Drawing Sheets

BRACKET FOR MOUNTING EXPANSION CARD TO DIFFERENT SLOTS

BACKGROUND

1. Technical Field

The present disclosure relates to a bracket, and more particularly, to a bracket which can mount an expansion card to different standard slots.

2. Description of Related Art

Expansion cards are widely used in computer systems for their capabilities of enhancing original processing abilities of the electronic components of the computer systems or adding new functions for the computer systems. There are two different types of expansion cards commonly used in computer systems, which have different lengths. Correspondingly, the enclosures of the computer systems are also designed to have two different standard slots suitable for the lengths of the two type expansion cards. The two different standard slots are often called as "half-width slot" and "full-width slot", respectively. The expansion cards generally use corresponding brackets to mount in the slots of the enclosures. However, a conventional bracket can only be suitable for one standard slot and cannot be mounted in the other standard slot. That is to say, if the expansion card is required to be mounted from slot of one standard of an enclosure to slot of the other standard of another enclosure, the bracket supporting the expansion card should be replaced by another bracket which has a length suitable for the another standard slot. Such replacement of the bracket from the expansion card is inconvenient and labor-waste.

What is needed, therefore, is a bracket which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
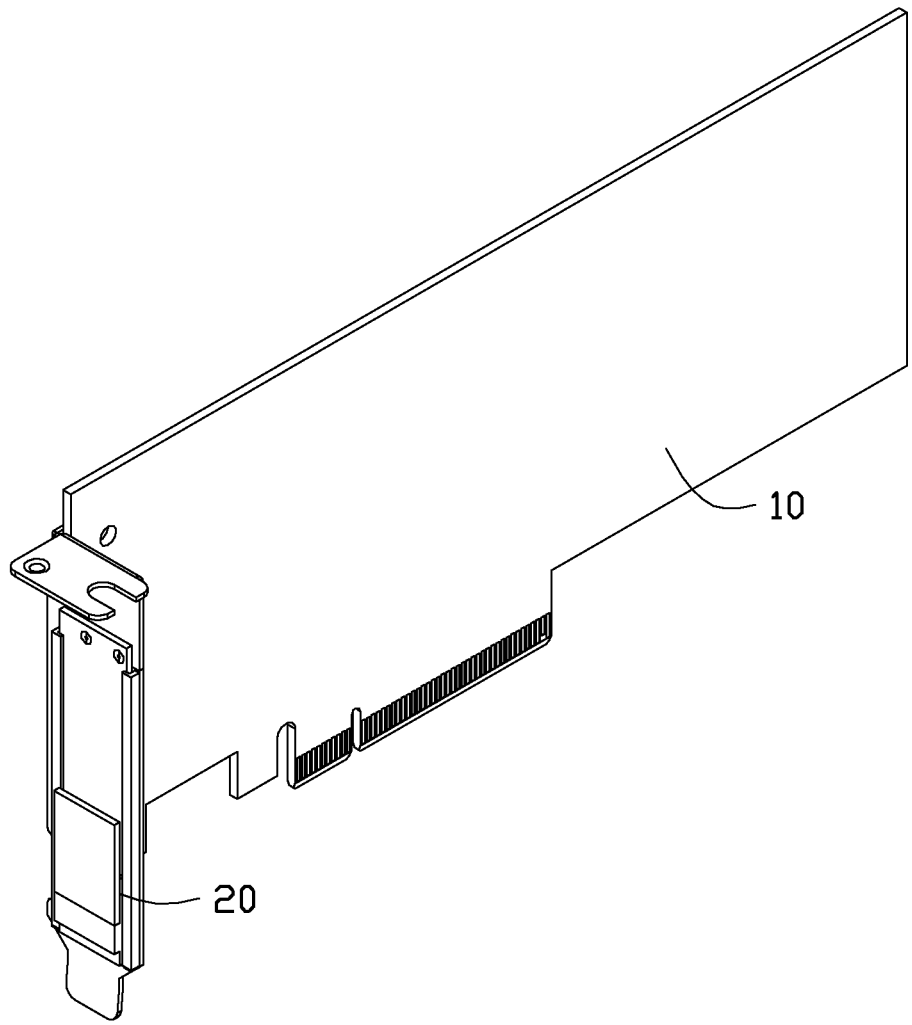
FIG. 1 shows a bracket of an embodiment of the present disclosure mounted on an expansion card.
Figure 2:
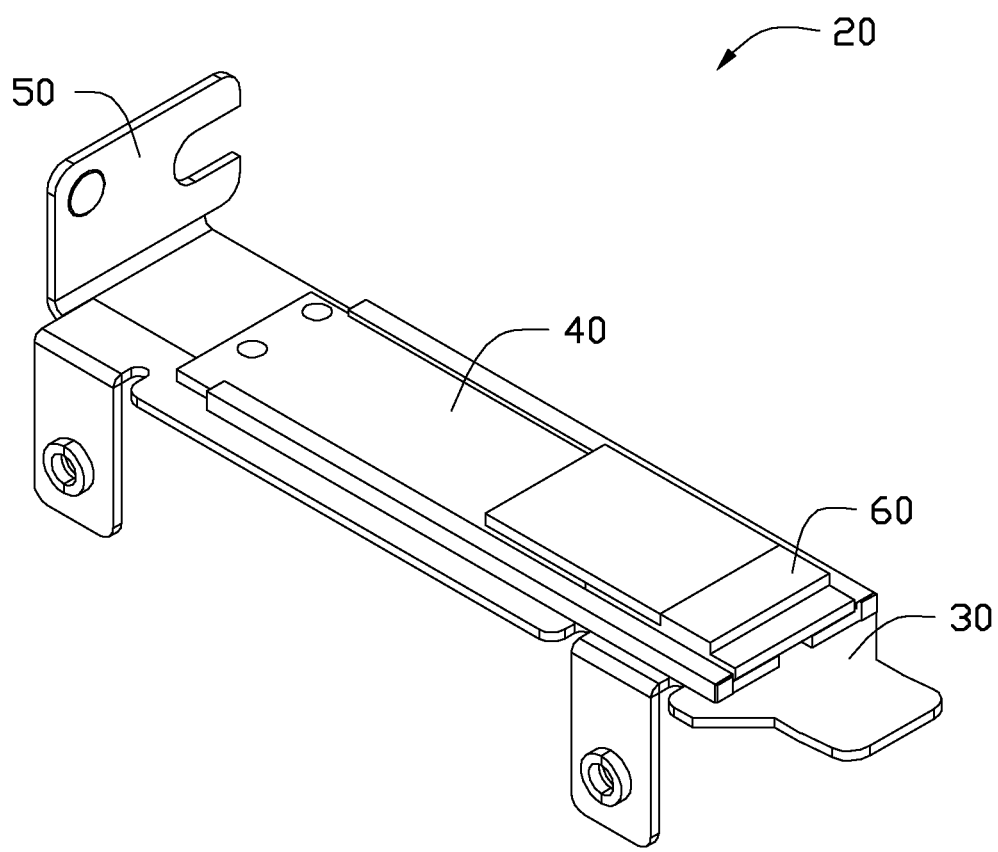
FIG. 2 shows the bracket of FIG. 1 from another aspect, wherein a locking element of the bracket is in a released position.
Figure 3:
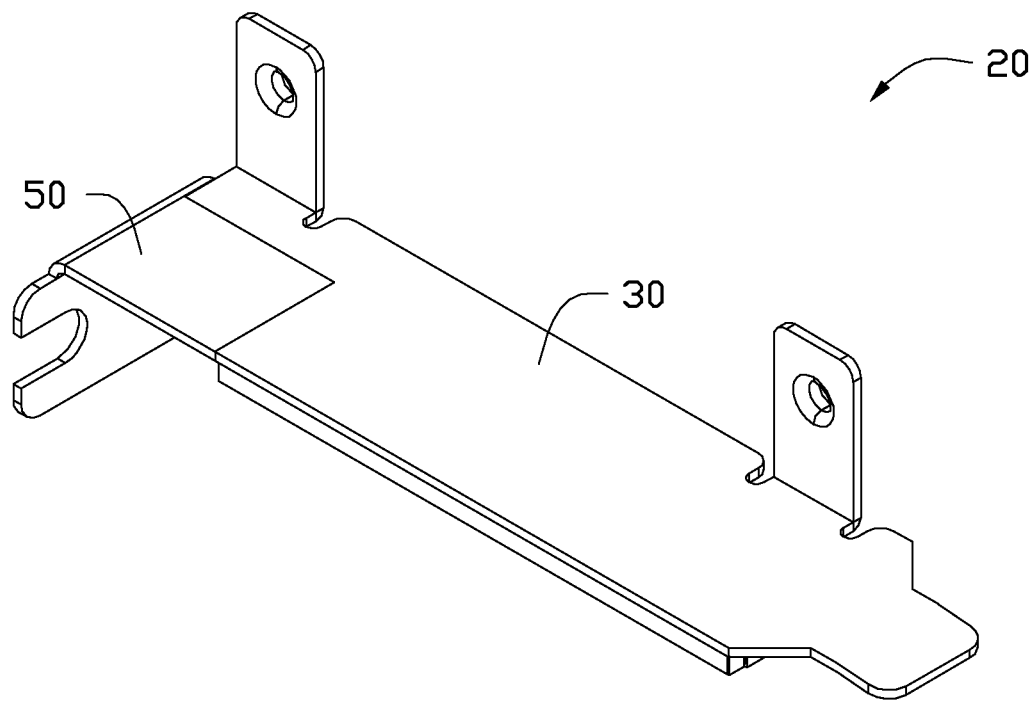
FIG. 3 shows an inverted state of the bracket of FIG. 2.

Referring to FIGS. 1-3, a bracket 20 for mounting an expansion card 10 to two different standard slots (not shown) is disclosed. The bracket 20 includes a base 30, a sliding element 40 slidably connected to the base 30, a locking element 60 attached on the sliding element 40 and a connecting element 50 fixed to the sliding element 40.

Figure 4:
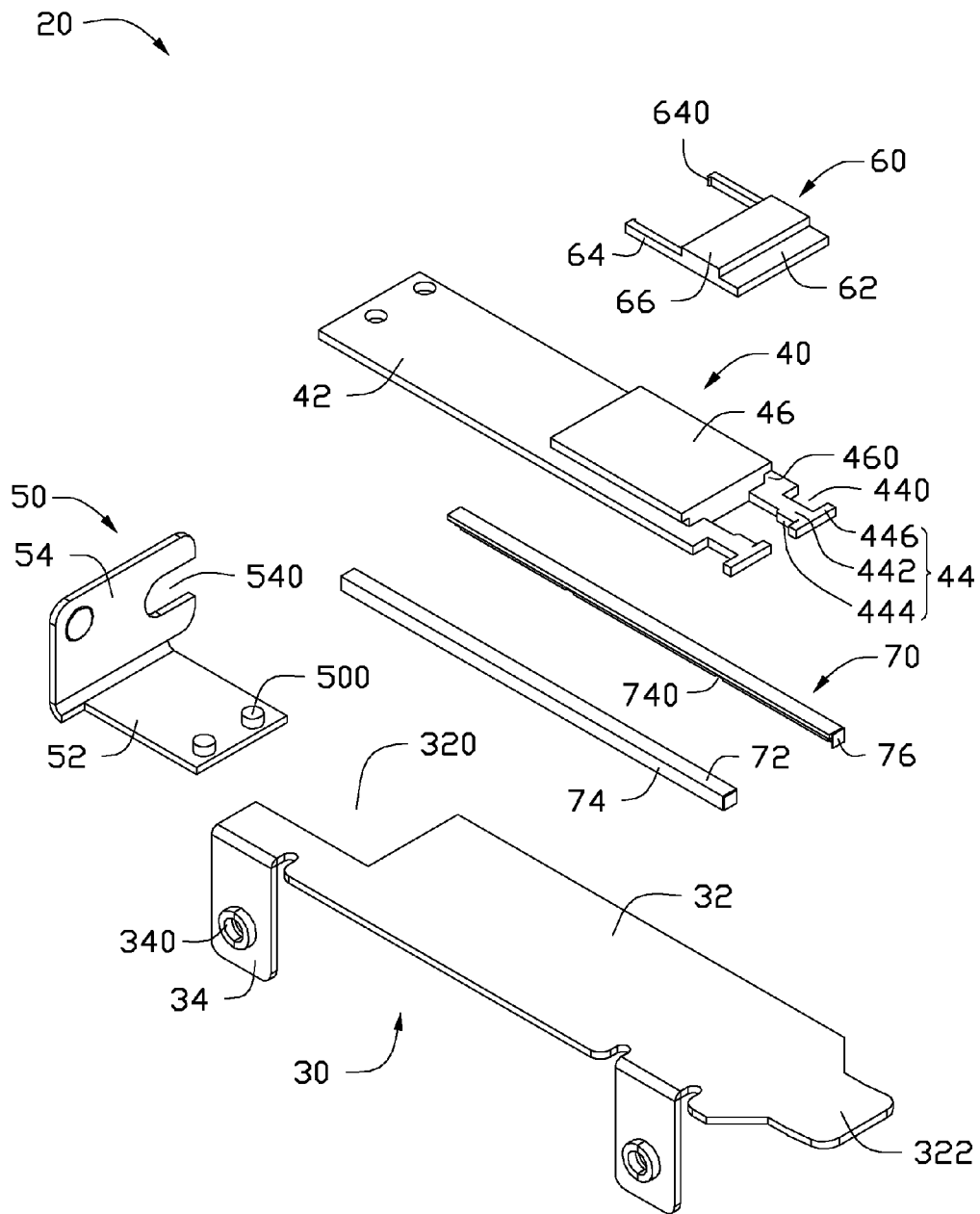
FIG. 4 shows an exploded state of the bracket of FIG. 2.
Figure 5:
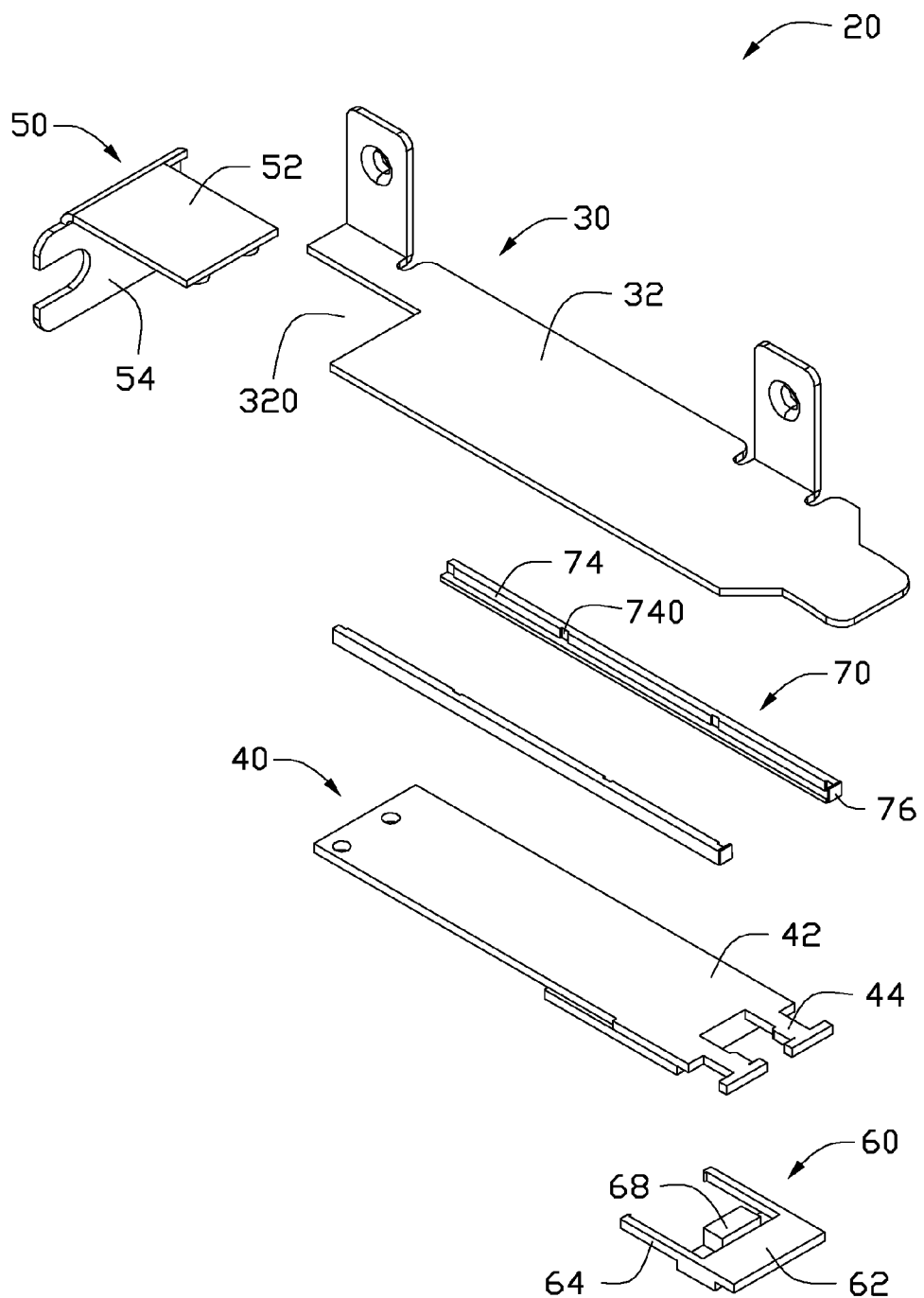
FIG. 5 shows an inverted state of the bracket of FIG. 4.
Figure 6:
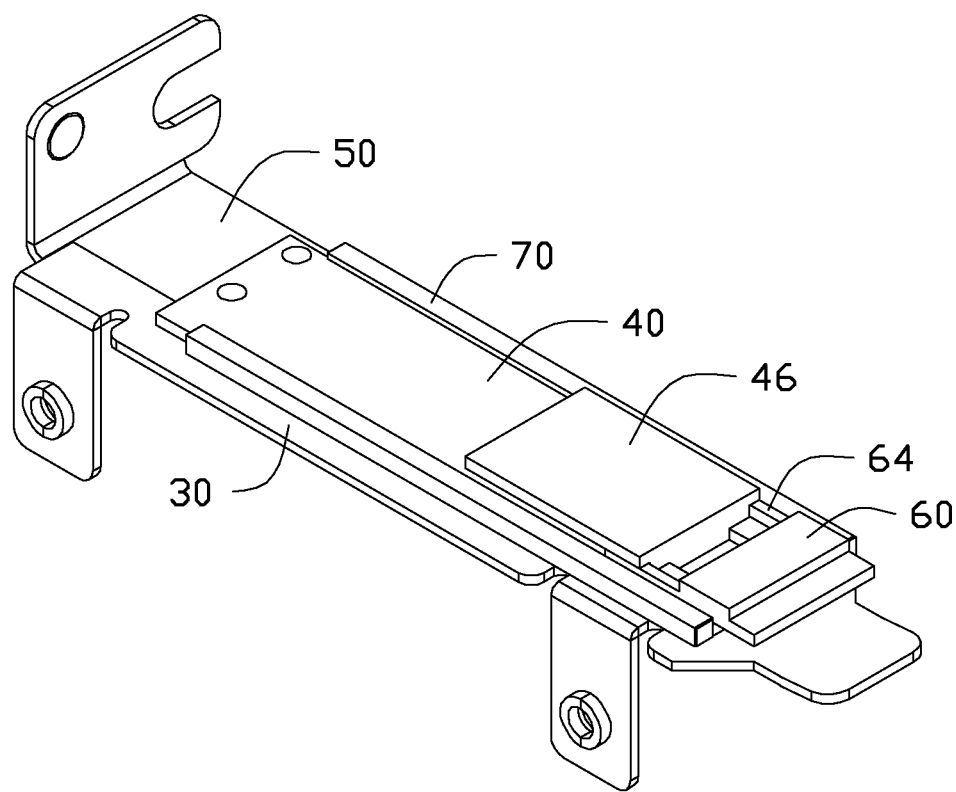
FIG. 6 is similar to FIG. 2, wherein the locking element of the bracket is in a locked position.
Figure 7:
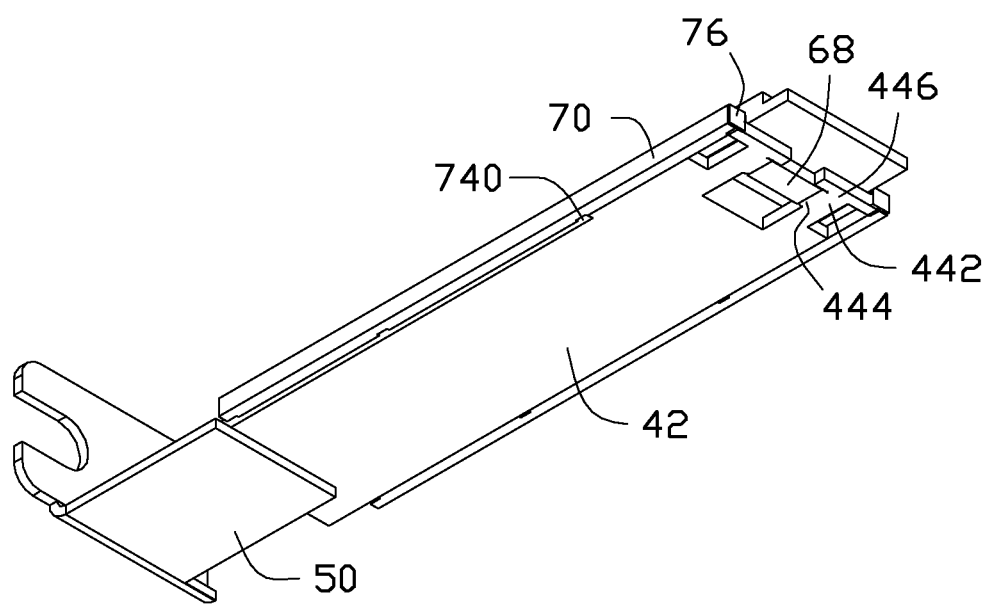
FIG. 7 shows the bracket of FIG. 6 from a bottom aspect, wherein a base of the bracket is removed for clarity.
Figure 8:
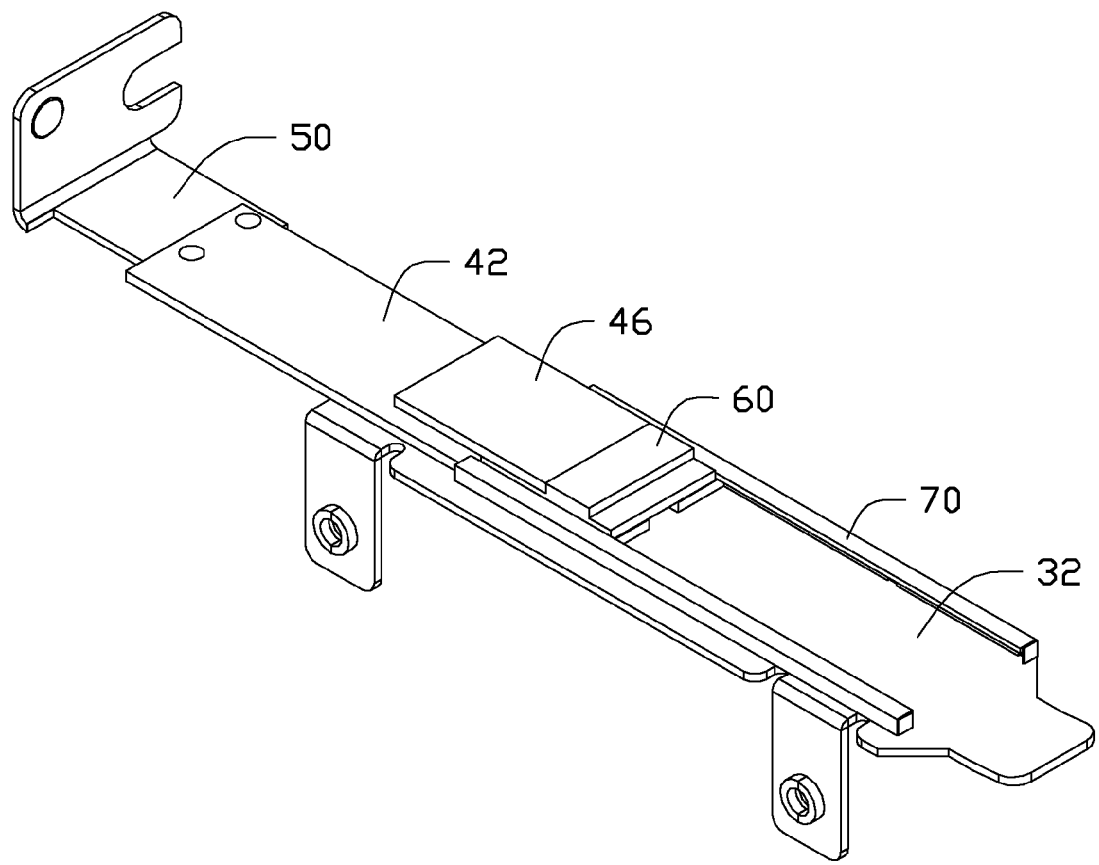
FIG. 8 is similar to FIG. 2, wherein a connecting element of the bracket is in another position different from that shown in FIG. 2.
Figure 9:
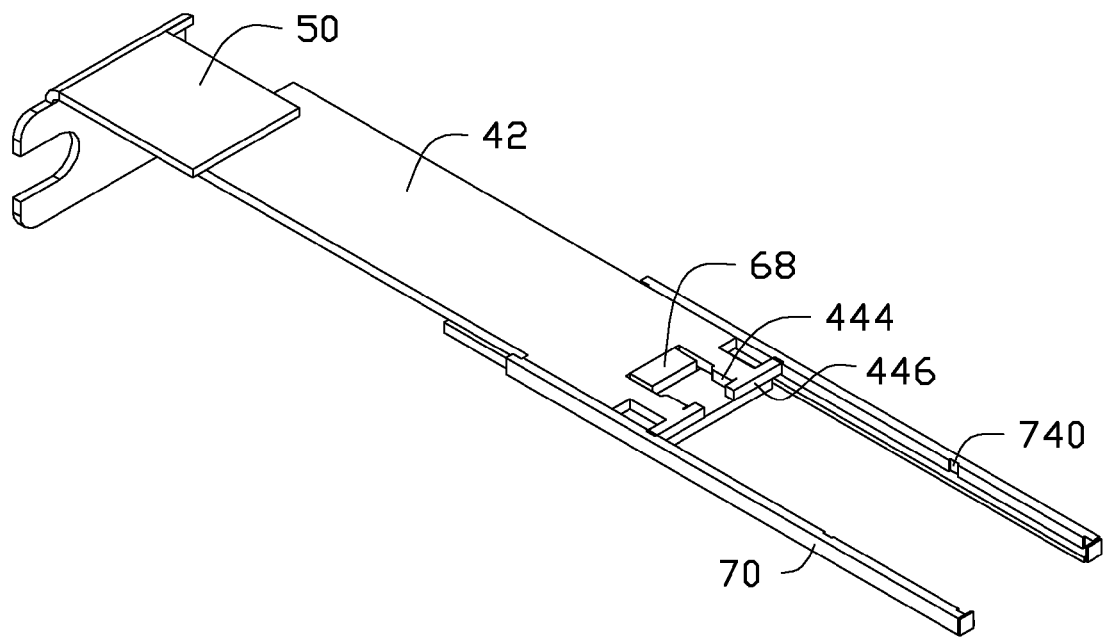
FIG. 9 shows an inverted state of the bracket of FIG. 8, wherein the base is removed for clarity.
Figure 10:
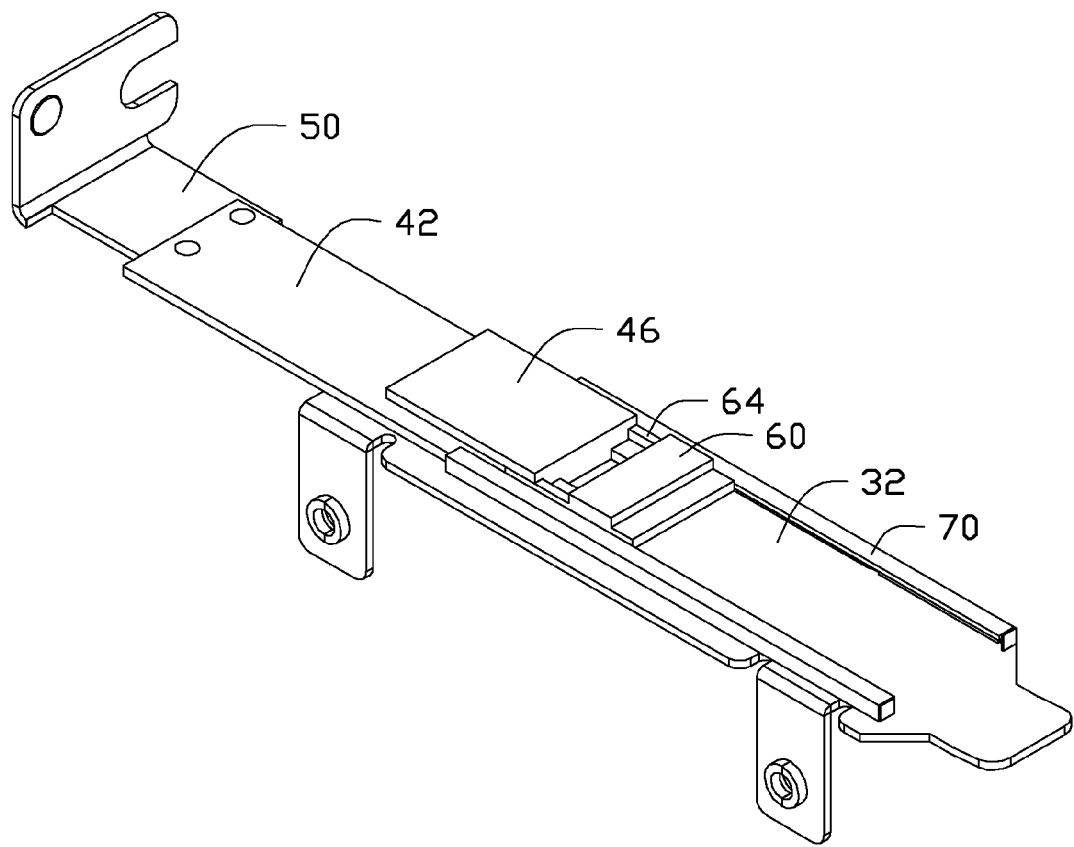
FIG. 10 is similar to FIG. 8, wherein the locking element is in a locked position.
Figure 11:
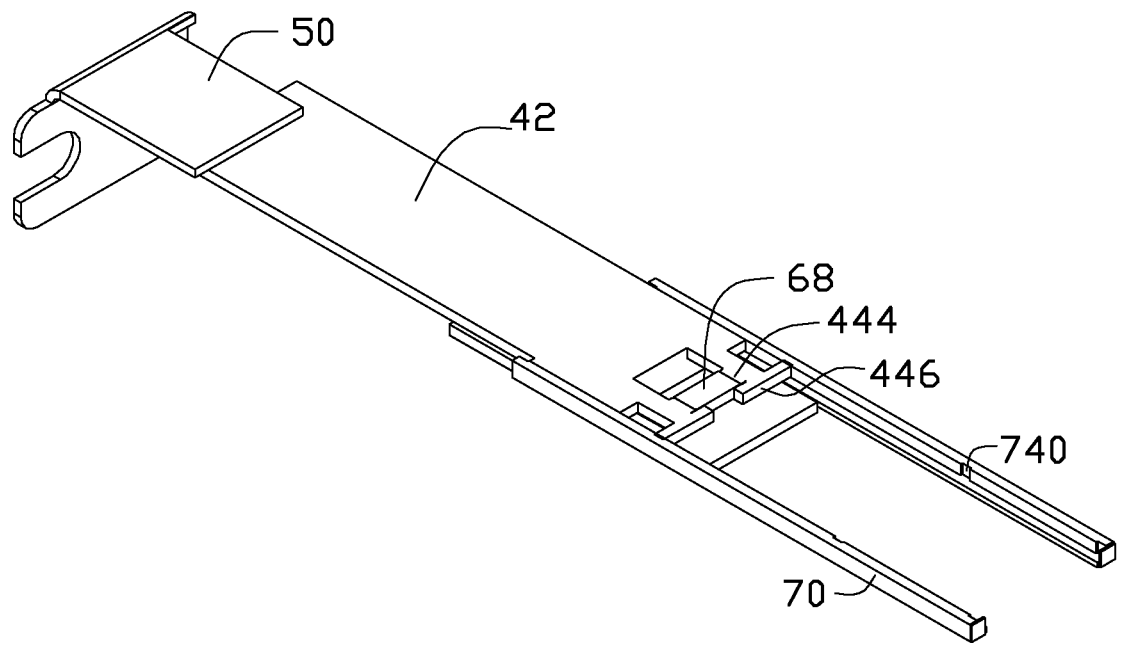
FIG. 11 shows an inverted state of the bracket of FIG. 10, wherein the base is removed for clarity.

Also referring to FIGS. 4-5, the base 20 includes a rectangular bottom plate 32 and a pair of flanges 34 extending downwardly from a left side of the bottom plate 32. The bottom plate 32 defines a rectangular cutout 320 in a rear end thereof for receiving the connecting element 50 and forms a narrow end 322 on a front end thereof for inserting into a corresponding structure of an enclosure (not shown). The two flanges 34 are located adjacent to the front and rear ends of the bottom plate 32, respectively. Each flange 34 defines a through hole 340 therein for extending a screw (not shown) therethrough and into the expansion card 10, to thereby secure the expansion card 10 to the bracket 20. A pair of rails 70 are fixed to left and right sides of a top face of the bottom plate 32, respectively. The two rails 70 are used for receiving two opposite sides of the sliding element 40 so that the sliding element 40 is slidable along the two rails 70. Each rail 70 is extended along a front-to-rear direction. Each rail 70 includes a top wall 72, a side wall 74 extending downwardly from a side of the top wall 72 and a lid 76 fixed to the top wall 72 and the side wall 74. The side wall 74 of each rail 70 has a plurality of holes 740 defined along a length thereof. The holes 740 are used for confining the sliding element 40 at different positions. The lid 76 is connected to front ends of the top wall 72 and the side wall 74. The lid 76 is used to abut against a front end of the sliding element 40 for preventing the sliding element 40 from sliding out of the rails 70.

The sliding element 40 includes a top plate 42, a guiding plate 46 formed on a top face of the top plate 42 and a pair of elastic arms 44 extending horizontally from a front side of the top plate 42. The top plate 42 has a size smaller than that of the bottom plate 32. The top plate 42 is slidably received between the two opposite rails 70. The two elastic arms 44 are symmetrical with each other. The two elastic arms 44 are also sandwiched between the two rails 70 in order to position the sliding element 40 at the different positions. Each elastic arm 44 includes a beam 442 extending frontward from the front side of the top plate 42, a rib 446 extending perpendicularly from a front end of the beam 442 and a protrusion 444 protruded from a lateral side of the beam 442. The beam 442 has a predetermined width so that the front end of the beam 442 is elastically movable along a left-to-right direction. The rib 446 is extended along the left-to-right direction and movable along the left-to-right direction by driven of the beam 442. The ribs 446 can selectively engage in a pair of ones of the holes 740 defined in the rails 70, to thereby realize position of the sliding element 40 to the rails 70. The two protrusions 444 are protruded towards each other and each protrusion 444 is located adjacent to a corresponding rib 446. Distances between the two beams 442, the two blocks 444 and the two ribs 446 gradually decrease. The top plate 42 and the beam 442 and the rib 446 of each elastic arm 44 cooperatively surround a rectangular opening 440 therebetween. The guiding plate 46 is located neighboring to the two elastic arms 44. The guiding plate 46 defines two grooves 460 at right and left sides thereof for receiving corresponding parts of the locking element 60.

The locking element 60 includes a rectangular panel 62, an operating plate 66 formed on a top face of the panel 62, a pair of sliding poles 64 extending rearwards from the panel 62 and a block 68 protruding downwardly from a bottom face of the operating plate 66. The panel 62 is disposed on top faces of the two elastic arms 44 for supporting the locking element 60 on the sliding element 40. The operating plate 66 has a portion connected to the top face of the panel 62 and another portion extending beyond the panel 62 and connecting with the two sliding poles 64. The operating plate 66 is operable by an user to thereby drive the locking element 60 to move on the sliding element 40. The two sliding poles 64 are slidably received in the two grooves 460 to limit the locking element 60 to slide along the front-to-rear direction. Each sliding pole 64 has a hook 640 formed on a distal end thereof for engaging in holes (not shown) defined in the guiding plate 46, thereby positioning the locking element 60 to the sliding element 40 at different positions. The block 68 is protruded from the bottom face of the another portion of the operating plate 66. The block 68 is located between the two sliding poles 64. The block 68 has a width similar to the distance between the two protrusions 444 of the locking element 40. The operating plate 66 can be pushed to be spaced from the guiding element 46 to set the locking element 60 in a locked state. The block 68 is driven by the operating plate 66 to be sandwiched between the two protrusions 444 to prevent the two ribs 446 from moving along the left-to-direction, thereby securing the ribs 446 in the holes 740 of the rails 74. The operating plate 66 can also be pushed to press against the guiding plate 46 to thereby set the locking element 60 in a released state. The block 68 is driven by the operating plate 66 to remove from a gap between the two protrusions 444 so that the two ribs 446 are released to restore their resilience, and the ribs 446 are thus movable from the holes 740 to other locations of the rails 74.

The connecting element 50 includes a tab 52 and a connecting plate 54 extending upwardly from a rear end of the tab 52. The tab 52 is connected to a bottom face of the top plate 42 of the sliding element 40 via two screws 500. The tab 52 is coplanar with the bottom plate 32 and has a size equal to the cutout 320 of the base 30, whereby the tab 52 can be substantially received in the cutout 320 of the base 30 and directly connected to the bottom plate 32, following movement of the sliding element 40 on the base 30. The connecting plate 54 has a slot 540 defined in a right side thereof for engaging with a corresponding structure of the enclosure.

Also referring to FIGS. 6-11, as the bracket 20 is required to be mounted in a half-width slot of an enclosure, the sliding element 40 is pushed towards the narrow end 322 of the base 30 along the rails 70, until the two ribs 446 of the sliding element 40 are engaged in two front holes 740 of the rails 70. The locking element 60 is then operated frontwards along the guiding plate 46 until the block 68 is sandwiched between the two protrusions 444, thereby firmly securing the sliding element 40 on the base 30. The connecting element 50 is brought by the sliding element 40 to be received in the cutout 320 of the base 30. Thus, the bracket 20 is transformed to have a length fitting the half-width slot of the enclosure, and can be mounted within the half-width slot to fix the expansion card 10 to the enclosure. If the bracket 20 is required to be mounted in a full-width slot of an enclosure, the sliding element 60 is brought to slide rearwards along the rails 70, until the ribs 446 of the sliding element 40 are received in a pair of rear holes 740 in the rails 74. The locking element 60 is then pushed from a released state to a locked state where the block 68 is sandwiched between and presses against the two protrusions 444, thereby securing the sliding element 40 to the base 30. The connecting element 50 is driven by the sliding element 40 to located behind the rear end of the base 30 and be spaced a distance from the base 30. Thus, the bracket 20 is transformed to have a length fitting the full-width slot of the enclosure, and the expansion card 10 is thus able to be mounted to the enclosure.

It is believed that the present disclosure and its advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. A bracket for mounting an expansion card to an enclosure, comprising:
    a base for attaching the expansion card thereon;
    a pair of rails fixed on the base;
    a sliding element disposed on the base and slidably sandwiched between the rails;
    a connecting element secured to the sliding element; and
    a locking element slidably connected to the sliding element;
    wherein the sliding element is slidable along the rails to bring the connecting element to a first position where the connecting element and the base have a first distance therebetween or a second position where the connecting element and the base have a second distance therebetween, the first distance being different from the second distance;
    wherein the locking element is slidable along the sliding element to fix the sliding element to the base or release the sliding element from the base;
    wherein the sliding element comprises a top plate and a pair of elastic arms extending from the top plate along a first direction, the elastic arms being deformable along a second direction as the sliding element is released from the base, and the elastic arms being locked as the sliding element is fixed to the base by the locking element;
    wherein each of the arms comprises a beam connecting with the top plate, a rib extending from an end of the beam and a protrusion protruded from a side of the beam, the rib being movable along the second direction with deformation of the beam; and
    wherein the sliding element further comprises a guiding plate formed on the top plate, the guiding plate having two grooves defined at two opposite sides thereof, and the locking element being slidably inserted into the two grooves.

2. The bracket of claim 1, wherein the rib is oriented perpendicular to the beam.

3. The bracket of claim 1, wherein the second direction is perpendicular to the first direction.

4. The bracket of claim 1, wherein distances between the two beams, the two protrusions and the two ribs gradually decrease along the first direction.

5. The bracket of claim 1, wherein the guiding plate is located adjacent to the two elastic arms.

6. The bracket of claim 1, wherein the locking element comprises a panel disposed on the two elastic arms and a pair of sliding poles inserted into the two grooves of the guiding plate, the sliding poles extending from the panel along a third direction.

7. The bracket of claim 6, wherein the third direction is opposite to the first direction.

8. The bracket of claim 6, wherein the locking element further comprises a block protruding downwardly, the block being movable between a locked position where the block is sandwiched between and presses against the two protrusions of the sliding element and a released position where the block is away from the two protrusions of the sliding element.

9. The bracket of claim 8, wherein the block is located between the two sliding poles.

10. The bracket of claim 8, wherein the locking element further comprises an operating plate formed on a top face of the panel, the operating plate having a portion extending beyond the panel and connected to the sliding poles.

11. The bracket of claim 10, wherein the block is formed downwardly from a bottom face of the portion of the operating plate extending beyond the panel.

12. The bracket of claim 1, wherein the connecting element is directly connected to the base at the first position, and the connecting element is spaced from the base via the sliding element at the second position.

13. The bracket of claim 12, wherein the connecting element comprises a tab and a connecting plate extending upwardly from the tab, the tab being fixed to a bottom face of the sliding element.

14. The bracket of claim 13, wherein the base defines a cutout at an end thereof, the tab of the connecting element being received in the cutout at the first position.

15. The bracket of claim 13, wherein the base comprises a bottom plate and a pair of flanges extending downwardly from the bottom plate, the tab of the connecting element being coplanar with the bottom plate of the base.

16. A bracket for mounting an expansion card to an enclosure, comprising:
   a base for attaching the expansion card thereon;
   a pair of rails fixed on the base;
   a sliding element disposed on the base and slidably sandwiched between the rails;
   a connecting element secured to the sliding element; and
   a locking element slidably connected to the sliding element;
   wherein the sliding element is slidable along the rails to bring the connecting element to a first position where the connecting element and the base have a first distance therebetween or a second position where the connecting element and the base have a second distance therebetween, the first distance being different from the second distance;
   wherein the locking element is slidable along the sliding element to fix the sliding element to the base or release the sliding element from the base;
   wherein the sliding element comprises a top plate and a pair of elastic arms extending from the top plate along a first direction, the elastic arms being deformable along a second direction as the sliding element is released from the base, and the elastic arms being locked as the sliding element is fixed to the base by the locking element;
   wherein each of the arms comprises a beam connecting with the top plate, a rib extending from an end of the beam and a protrusion protruded from a side of the beam, the rib being movable along the second direction with deformation of the beam; and
   wherein distances between the two beams, the two protrusions and the two ribs gradually decrease along the first direction.

* * * * *